(12) United States Patent
Wang

(10) Patent No.: US 6,496,764 B1
(45) Date of Patent: Dec. 17, 2002

(54) VEHICLE IMPACT-SENSING METHOD WITH IMPROVED SEVERITY DISCRIMINATION

(75) Inventor: Jenne-Tai Wang, Troy, MI (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 09/935,853

(22) Filed: Aug. 23, 2001

(51) Int. Cl.$^7$ ................................................. G06F 7/00
(52) U.S. Cl. ...................................... 701/45; 280/728.1
(58) Field of Search ........................... 701/45; 280/735, 280/728.1, 734; 340/901, 903, 435, 436, 438; 307/9.1

(56) References Cited

U.S. PATENT DOCUMENTS

| | | | |
|---|---|---|---|
| 3,097,354 A | 7/1963 | Blowney et al. | 343/6.5 |
| 4,714,925 A | 12/1987 | Bartlett | 340/825.55 |
| 5,317,309 A | 5/1994 | Vercellotti et al. | 340/825.54 |
| 5,508,920 A | 4/1996 | Gioutsos et al. | 364/424.05 |
| 5,540,461 A | 7/1996 | Nitschke et al. | 280/735 |
| 5,546,311 A | 8/1996 | Sekine | 364/449 |
| 5,563,589 A | 10/1996 | Blaimont et al. | 340/933 |
| 5,684,474 A | 11/1997 | Gilon et al. | 340/903 |
| 5,748,477 A | 5/1998 | Katoh | 364/461 |
| 5,785,347 A | 7/1998 | Adolph et al. | 280/735 |
| 5,787,377 A | 7/1998 | Watanabe et al. | 701/45 |
| 5,835,007 A | 11/1998 | Kosiak | 340/436 |
| 5,841,367 A | 11/1998 | Giovanni | 340/903 |
| 5,845,000 A | 12/1998 | Breed et al. | 382/100 |
| 5,964,817 A | 10/1999 | Dalum et al. | 701/45 |
| 5,999,871 A | 12/1999 | Liu | 701/45 |
| 6,012,008 A | 1/2000 | Scully | 701/45 |

OTHER PUBLICATIONS

Copending application Attorney Docket No. GP–300151 "Vehicle Sensing System Using Biased Serverity Measure"—Jenne–Tai Wang, No date.

*Primary Examiner*—Yonel Beaulieu
(74) *Attorney, Agent, or Firm*—Kathryn A. Marra

(57) ABSTRACT

A vehicle impact-sensing system is disclosed which discriminates a severe impact event from a minor impact incident. The sensing system is enabled by a preliminary stage of the sensing algorithm in response to an occurrence of an acceleration in excess of an enabling threshold. In the sensing algorithm, a first phase evaluates the likelihood potential of an impact event using a measure derived from the signals provided by a remote sensor at the front end of the vehicle. A second phase determines the timing to trigger the deployment of airbags by using the predicted occupant movement as the measure. A third phase determines the severity of the impact event using a measure derived from accelerometer signals and deploys either a single-stage or a multi-stage inflation of airbags.

10 Claims, 8 Drawing Sheets

FIG. 3

| FIG. 3A | FIG. 3B |
|---|---|

$V_r = V_{rad} - V_{radF1}$ (m/s)

| | All-Fire Events | | | | | | | | | | | | | | | | |
|---|---|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 | 16 | 17 |
| Time | F8 | F7 | F6 | F5 | F4$^{1/2}$ | R2 | F2$^1$ | F3$^1$ | A3 | R4 | O3 | O2$^{1/2}$ | A2 | A6 | A1$^1$ | P3 | A5 |
| 0.0 | 0.0 | 0.0 | 0.0 | 0.0 | 0.0 | 0.0 | 0.0 | 0.0 | 0.0 | 0.0 | 0.0 | 0.0 | 0.0 | 0.0 | 0.0 | 0.0 | 0.0 |
| 1.3 | 0.3 | 0.2 | 0.0 | 0.2 | 0.1 | 0.6 | -0.1 | 0.0 | 0.1 | 0.4 | 0.6 | 0.6 | 0.1 | 0.2 | 0.2 | -0.4 | 0.2 |
| 2.5 | 1.0 | 0.8 | 0.2 | 0.5 | 0.3 | 1.0 | 0.1 | 0.2 | 0.6 | 1.0 | 0.9 | 1.0 | 0.3 | 0.3 | 0.4 | 0.3 | 0.3 |
| 3.8 | 1.2 | 1.3 | 0.6 | 1.0 | 0.5 | 0.2 | 0.4 | 0.2 | 0.6 | 0.8 | 0.2 | 0.8 | 0.4 | 0.2 | 0.4 | 0.8 | 0.4 |
| 5.0 | 1.3 | 0.8 | 0.9 | 0.9 | 0.6 | 0.3 | 0.2 | 0.3 | 0.3 | 0.1 | 0.0 | -0.1 | -0.4 | -0.5 | -0.2 | -0.2 | -0.5 |
| 6.3 | 0.6 | 1.4 | 0.3 | 0.3 | 0.3 | -0.2 | 0.1 | 0.4 | 0.0 | -0.1 | 0.1 | 0.1 | -0.4 | -0.5 | -0.5 | -0.7 | -0.6 |
| 7.5 | 0.4 | 0.7 | 0.6 | 0.2 | 0.3 | -0.1 | 0.2 | -0.1 | 0.3 | -0.3 | -0.1 | -0.4 | -0.3 | -0.2 | -0.2 | -0.9 | -0.5 |
| 8.8 | -0.2 | 0.5 | 0.5 | 0.8 | 0.6 | 0.2 | -0.2 | -0.1 | 1.0 | 0.0 | 0.1 | -0.4 | -0.3 | 0.4 | 0.0 | -0.7 | 0.0 |
| 10.0 | 0.4 | 0.5 | 0.0 | 1.1 | 1.2 | 0.6 | 0.0 | 0.4 | 0.6 | -0.1 | 0.1 | 0.1 | 0.0 | 0.8 | -0.5 | -0.1 | 0.2 |
| 11.3 | | 1.0 | 0.1 | 0.5 | 0.7 | 0.9 | 0.1 | 0.3 | 0.7 | 0.1 | -0.1 | -0.2 | 0.4 | 0.4 | -0.1 | 0.1 | 0.2 |
| 12.5 | | | -0.4 | 0.9 | 0.6 | 0.7 | -0.3 | 0.2 | 0.3 | -0.2 | 0.4 | -0.3 | 0.6 | 0.4 | -0.4 | 0.6 | 0.1 |
| 13.8 | | | -0.5 | 0.7 | -0.2 | 0.1 | 0.2 | 0.0 | 0.1 | -0.1 | -0.1 | -0.2 | 0.6 | 0.7 | -0.7 | 1.1 | 0.5 |
| 15.0 | | | 0.0 | 0.7 | 0.1 | 0.5 | 0.2 | -0.5 | 0.2 | -0.5 | -0.6 | -0.8 | 0.3 | 0.6 | -0.6 | 0.9 | 0.3 |
| 16.3 | | | 0.8 | 1.1 | 0.9 | 1.3 | 0.1 | 0.2 | 0.7 | -0.8 | -0.2 | -1.0 | 0.6 | 1.4 | -0.1 | 1.5 | 0.3 |
| 17.5 | | | | 1.3 | 0.6 | 1.7 | -0.3 | 0.4 | 0.6 | -1.1 | 0.1 | -0.6 | 0.4 | 1.3 | -0.6 | 1.5 | 0.3 |
| 18.8 | | | | | 0.8 | 2.3 | 0.2 | 0.5 | 0.4 | -0.5 | 0.2 | -0.6 | 0.9 | 1.1 | -0.2 | 1.2 | 0.9 |
| 20.0 | | | | | 0.2 | 2.6 | 0.7 | 0.6 | 0.9 | 0.0 | -0.3 | -0.2 | 0.9 | 1.4 | -1.0 | 1.0 | 0.6 |
| 21.3 | | | | | | 0.0 | 0.5 | 1.5 | 0.6 | -0.8 | 0.3 | 1.2 | 1.8 | -0.4 | 1.2 | 0.4 |
| 22.5 | | | | | | | | 2.3 | 1.5 | 0.0 | 0.1 | 1.9 | 1.4 | -0.5 | 0.9 | 0.9 |
| 23.8 | | | | | | | | 2.2 | 0.7 | 0.1 | -1.1 | 2.0 | 1.5 | -0.5 | 1.0 | 0.9 |
| 25.0 | | | | | | | | | | | 0.2 | -1.5 | 2.5 | 1.8 | -0.7 | 1.0 | 0.8 |
| 26.3 | | | | | | | | | | | | -0.9 | 2.4 | 1.4 | -0.3 | 1.6 | 1.6 |
| 27.5 | | | | | | | | | | | | -0.4 | 2.3 | 1.8 | -0.6 | 2.1 | 2.0 |
| 28.8 | | | | | | | | | | | | | | -0.9 | 2.0 | 2.4 |
| 30.0 | | | | | | | | | | | | | | -0.4 | 1.2 | 2.6 |
| 31.3 | | | | | | | | | | | | | | | | | 2.3 |
| 32.5 | | | | | | | | | | | | | | | | | |
| 33.8 | | | | | | | | | | | | | | | | | |
| 35.0 | | | | | | | | | | | | | | | | | |
| 36.3 | | | | | | | | | | | | | | | | | |
| 37.5 | | | | | | | | | | | | | | | | | |
| 38.8 | | | | | | | | | | | | | | | | | |
| 40.0 | | | | | | | | | | | | | | | | | |
| 41.3 | | | | | | | | | | | | | | | | | |
| 42.5 | | | | | | | | | | | | | | | | | |
| 43.8 | | | | | | | | | | | | | | | | | |
| 45.0 | | | | | | | | | | | | | | | | | |
| 46.3 | | | | | | | | | | | | | | | | | |
| 47.5 | | | | | | | | | | | | | | | | | |
| 48.8 | | | | | | | | | | | | | | | | | |
| 50.0 | | | | | | | | | | | | | | | | | |
| 51.3 | | | | | | | | | | | | | | | | | |
| 52.5 | | | | | | | | | | | | | | | | | |
| 53.8 | | | | | | | | | | | | | | | | | |
| MAX | 1.3 | 1.4 | 0.9 | 1.3 | 1.2 | 2.6 | 0.7 | 0.6 | 2.3 | 1.5 | 0.9 | 1.0 | 2.5 | 1.8 | 0.4 | 2.1 | 2.6 |

NOTES
1. All data after the desired sensing times are truncated from this figure.
2. Shaded boxes signify when the measure is greater then or equal to the threshold value of Th1.

Event requirements: "1" - a single stage inflation; "1/2" - either a single or dual stage stage inflation; Unmarked - a dual stage inflation.

FIG. 3A

| All-Fire Events | | | | | | | | No-Fire Events | | | | | |
|---|---|---|---|---|---|---|---|---|---|---|---|---|---|
| 18 | 19 | 20 | 21 | 22 | 23 | 24 | 25 | | | | | | |
| O1[1] | P4 | E2 | P2 | O4[1/2] | O5 | A4[1] | P1[1/2] | F1 | E1 | E3 | E4 | E5 | R1 | R3 |
| 0.0 | 0.0 | 0.0 | 0.0 | 0.0 | 0.0 | 0.0 | 0.0 | 0.0 | 0.0 | 0.0 | 0.0 | 0.0 | 0.0 | 0.0 |
| 0.3 | 0.0 | 0.6 | 0.5 | -0.1 | -0.1 | 0.1 | 0.1 | 0.0 | 0.0 | 0.0 | 0.6 | 0.0 | 0.1 | 0.0 |
| 0.5 | 0.3 | 1.3 | 0.9 | 0.1 | -0.1 | 0.1 | 0.7 | 0.0 | 0.0 | 0.5 | 1.3 | 0.1 | 0.1 | 0.0 |
| 0.5 | 0.5 | 1.8 | 0.4 | 0.3 | -0.1 | -0.1 | 0.5 | 0.0 | -0.3 | -0.2 | 1.8 | -0.1 | 0.0 | 0.0 |
| 0.1 | 0.4 | 2.1 | -0.3 | 0.5 | -0.1 | -0.4 | -0.4 | 0.0 | -0.6 | -0.4 | 1.3 | -0.4 | -0.3 | -0.3 |
| -0.1 | -0.2 | 2.8 | -0.4 | 0.3 | 0.2 | -0.4 | -0.3 | 0.0 | -0.5 | 0.2 | 1.7 | -0.3 | -0.3 | -0.3 |
| 0.0 | 0.0 | 2.8 | -0.2 | 0.1 | 0.6 | -0.5 | -0.3 | 0.0 | -0.4 | -0.5 | 2.1 | -0.2 | -0.4 | -0.4 |
| 0.2 | -0.2 | 2.2 | 0.3 | -0.2 | 0.3 | -0.4 | -0.5 | 0.0 | -0.5 | -1.0 | 2.2 | -0.1 | -0.4 | -0.4 |
| 0.3 | -0.5 | 1.4 | -0.3 | -0.3 | -0.4 | -0.5 | -0.4 | 0.0 | -0.8 | -0.5 | 2.2 | -0.3 | -0.3 | -0.5 |
| 0.2 | -0.2 | 0.7 | 0.3 | -0.4 | -0.1 | -0.5 | -0.4 | 0.0 | -1.0 | -0.4 | 2.1 | -0.4 | 0.0 | -0.6 |
| 0.1 | -0.2 | 0.9 | 0.7 | -0.1 | 0.4 | -0.5 | -0.5 | 0.0 | -1.1 | -0.6 | 1.3 | -0.6 | -0.7 | -0.5 |
| -0.2 | 0.2 | 1.1 | 0.9 | 0.2 | 0.2 | -0.4 | -0.7 | 0.0 | -1.3 | -0.8 | 0.8 | -0.6 | -0.7 | -0.6 |
| 0.0 | 0.5 | 0.2 | 1.3 | 0.2 | 0.1 | -0.5 | -1.0 | 0.0 | -1.4 | -1.3 | 0.1 | -0.6 | -0.6 | -0.7 |
| 0.5 | 0.8 | -0.3 | 2.1 | 0.7 | 0.1 | -0.2 | -0.9 | 0.0 | -1.4 | -1.3 | -0.3 | -0.4 | -0.4 | -0.6 |
| -0.5 | 0.2 | -0.5 | 2.4 | 0.3 | 0.0 | -0.5 | -0.6 | 0.0 | -1.5 | -1.6 | -1.2 | -0.7 | -0.7 | -0.8 |
| -0.4 | 0.8 | 0.1 | 2.9 | 0.1 | 0.2 | -0.5 | 0.0 | 0.0 | -1.5 | -1.6 | -2.0 | -0.7 | -0.6 | -0.9 |
| -0.1 | 1.3 | 0.7 | 2.7 | 0.4 | 0.7 | -0.5 | 0.2 | 0.0 | -1.8 | -1.8 | -2.8 | -0.7 | -1.2 | -0.9 |
| -0.2 | 1.9 | -0.1 | 2.7 | 1.0 | 0.5 | -0.6 | 0.8 | 0.0 | -1.9 | -1.9 | -3.4 | -0.6 | -1.0 | -0.9 |
| 0.2 | 2.5 | -0.5 | 3.1 | 0.6 | 0.7 | -0.5 | 1.7 | 0.0 | -1.7 | -1.6 | -3.7 | -0.2 | -0.6 | -0.4 |
| -0.6 | 1.9 | -1.2 | 2.4 | 0.6 | 0.4 | -0.9 | 1.8 | 0.0 | -2.1 | -2.3 | -4.8 | -0.6 | -1.0 | -0.9 |
| -0.5 | 1.5 | -2.0 | 2.1 | 0.4 | 0.4 | -1.3 | 1.7 | 0.0 | -2.4 | -2.5 | -5.6 | -0.8 | -1.4 | -1.2 |
| 0.2 | 1.0 | -2.5 | 1.6 | 0.4 | 1.2 | -1.0 | 1.4 | 0.0 | -2.3 | -2.2 | -5.8 | -0.6 | -1.0 | -0.8 |
| 0.2 | 0.4 | -2.4 | 0.7 | -0.5 | 1.6 | -0.6 | 1.1 | 0.0 | -2.4 | -2.3 | -6.4 | -0.8 | -1.5 | -1.1 |
| -0.4 | 0.5 | -2.9 | 0.9 | -0.2 | 1.7 | -0.3 | 0.7 | 0.0 | -2.5 | -2.8 | -7.0 | -1.0 | -1.4 | -1.4 |
| -0.9 | 0.6 | -3.3 | 1.4 | -0.1 | 2.2 | -0.4 | 1.3 | 0.0 | -2.6 | -2.9 | -7.6 | -1.0 | -1.7 | -1.2 |
| -0.6 | 0.3 | -2.7 | 1.9 | 0.4 | 2.8 | -0.5 | 1.7 | 0.0 | -2.4 | -2.8 | -7.8 | -1.0 | -1.8 | -1.0 |
| -0.3 | -0.1 | -1.8 | 1.5 | 1.3 | 3.4 | -0.4 | 1.3 | 0.0 | -1.8 | -2.5 | -7.5 | -0.7 | -1.6 | -0.9 |
| | | | 1.1 | 2.0 | 3.7 | -0.2 | 0.7 | 0.0 | -1.6 | -2.5 | -7.1 | -0.6 | -1.4 | -1.0 |
| | | | 1.1 | 1.9 | 3.3 | 0.5 | 0.4 | 0.0 | -1.0 | -2.4 | -6.9 | -0.5 | -1.4 | -0.7 |
| | | | | 1.6 | 3.0 | -0.2 | 0.3 | 0.0 | -1.9 | -2.9 | -7.4 | -1.1 | -1.7 | -0.4 |
| | | | | | | -0.6 | 0.4 | 0.0 | -2.4 | -3.2 | -7.7 | -1.5 | -2.1 | -1.3 |
| | | | | | | -0.4 | 0.8 | 0.0 | -2.5 | -3.2 | -7.6 | -1.6 | -2.1 | -1.3 |
| | | | | | | | 1.2 | 0.0 | -2.1 | -3.2 | -7.7 | -1.4 | -2.0 | -0.6 |
| | | | | | | | 1.6 | 0.0 | -1.6 | -3.0 | -7.6 | -1.2 | -1.9 | -0.5 |
| | | | | | | | | 0.0 | -2.5 | -3.3 | -7.9 | -1.5 | -2.1 | -0.7 |
| | | | | | | | | 0.0 | -2.1 | -3.5 | -7.9 | -1.6 | -2.2 | -1.1 |
| | | | | | | | | 0.0 | -1.4 | -3.5 | -7.7 | -1.6 | -2.1 | -1.2 |
| | | | | | | | | 0.0 | -1.3 | -3.4 | -7.6 | -1.5 | -1.7 | -0.9 |
| | | | | | | | | 0.0 | -1.0 | -3.4 | -7.7 | -1.7 | -1.6 | -1.1 |
| | | | | | | | | 0.0 | -1.4 | -3.5 | -8.0 | -1.9 | -1.9 | -1.2 |
| | | | | | | | | 0.0 | -1.9 | -3.8 | -8.3 | -2.0 | -2.1 | -1.5 |
| | | | | | | | | 0.0 | -2.1 | -3.9 | -8.4 | -2.1 | -2.0 | -1.8 |
| | | | | | | | | 0.0 | -2.3 | -3.9 | -8.3 | -2.0 | -2.2 | -1.9 |
| | | | | | | | | 0.0 | -3.9 | -3.8 | -8.3 | -1.9 | -2.2 | -1.5 |
| 0.5 | 2.5 | 2.8 | 3.1 | 2.0 | 3.7 | 0.5 | 1.8 | 0.0 | 0.0 | 0.5 | 2.2 | 0.1 | 0.1 | 0.0 |

| FIG. 4A | FIG. 4B |
|---|---|

POM: Predicted Occupant Movement (t+30 msec), using (5*1.25 msec) data to predict average acceleration

| | All-fire Events | | | | | | | | | | | | | | |
|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 |
| Time | F8 | F7 | F6 | F5 | F4$^{1/2}$ | R2 | F2$^1$ | F3$^1$ | A3 | R4 | O3 | O2$^{1/2}$ | A2 | A6 | A1$^1$ |
| 6.3 | 86 | 91 | 66 | 56 | 55 | 37 | 55 | 50 | 35 | 38 | 39 | 42 | 36 | 35 | 38 |
| 7.5 | 104 | 104 | 77 | 72 | 73 | 53 | 60 | 49 | 39 | 18 | 35 | 39 | 40 | 29 | 33 |
| 8.8 | 86 | 105 | 85 | 77 | 84 | 32 | 79 | 67 | 44 | 33 | 42 | 46 | 38 | 41 | 41 |
| 10.0 | 97 | 89 | 94 | 83 | 99 | 60 | 80 | 64 | 50 | 41 | 32 | 45 | 41 | 31 | 36 |
| 11.3 | | 98 | 74 | 83 | 90 | 70 | 103 | 80 | 51 | 56 | 49 | 43 | 48 | 42 | 48 |
| 12.5 | | | 84 | 78 | 91 | 85 | 93 | 65 | 69 | 60 | 54 | 41 | 48 | 41 | 47 |
| 13.8 | | | 83 | 82 | 78 | 91 | 108 | 83 | 75 | 74 | 62 | 48 | 52 | 37 | 56 |
| 15.0 | | | 91 | 83 | 84 | 109 | 100 | 70 | 83 | 68 | 65 | 43 | 65 | 57 | 58 |
| 16.3 | | | 83 | 87 | 70 | 112 | 107 | 94 | 85 | 65 | 69 | 55 | 67 | 52 | 67 |
| 17.5 | | | | 93 | 95 | 101 | 89 | 84 | 94 | 62 | 64 | 48 | 70 | 64 | 62 |
| 18.8 | | | | | 106 | 91 | 112 | 102 | 98 | 73 | 73 | 57 | 80 | 68 | 71 |
| 20.0 | | | | | 116 | 101 | 102 | 100 | 102 | 62 | 78 | 60 | 86 | 82 | 69 |
| 21.3 | | | | | | 118 | 108 | 101 | 52 | 90 | 75 | 90 | 50 | 77 | |
| 22.5 | | | | | | | 101 | 70 | 102 | 79 | 95 | 67 | 79 | | |
| 23.8 | | | | | | | | 104 | 64 | 109 | 98 | 105 | 59 | 89 | |
| 25.0 | | | | | | | | | 112 | 97 | 109 | 59 | 91 | | |
| 26.3 | | | | | | | | | | 103 | 113 | 63 | 102 | | |
| 27.5 | | | | | | | | | | 99 | 121 | 84 | 104 | | |
| 28.8 | | | | | | | | | | | | | 109 | | |
| 30.0 | | | | | | | | | | | | | 115 | | |
| 31.3 | | | | | | | | | | | | | | | |
| 32.5 | | | | | | | | | | | | | | | |
| 33.8 | | | | | | | | | | | | | | | |
| 35.0 | | | | | | | | | | | | | | | |
| 36.3 | | | | | | | | | | | | | | | |
| 37.5 | | | | | | | | | | | | | | | |
| 38.8 | | | | | | | | | | | | | | | |
| 40.0 | | | | | | | | | | | | | | | |
| 41.3 | | | | | | | | | | | | | | | |
| 42.5 | | | | | | | | | | | | | | | |
| 43.8 | | | | | | | | | | | | | | | |
| 45.0 | | | | | | | | | | | | | | | |
| 46.3 | | | | | | | | | | | | | | | |
| 47.5 | | | | | | | | | | | | | | | |
| 48.8 | | | | | | | | | | | | | | | |
| 50.0 | | | | | | | | | | | | | | | |
| 51.3 | | | | | | | | | | | | | | | |
| 52.5 | | | | | | | | | | | | | | | |
| 53.8 | | | | | | | | | | | | | | | |

NOTES

1. All data after the desired sensing times are truncated from this figure.

2. Shaded boxes signify when the measure is greater then or equal to the threshold value of Th1.

3. The corresponding time to the second shaded box in each column is the predicted sensing time.

4. Observe the consistent trends between the desired sesing times and the predicted sensing time.

Event requirements: "1" - a single stage inflation; "1/2" - either a single or dual stage inflation; Unmarked - a dual stage inflation.

FIG. 4A

| All-fire Events | | | | | | | | | | No-fire Events | | | | | | |
|---|---|---|---|---|---|---|---|---|---|---|---|---|---|---|---|---|
| 16 | 17 | 18 | 19 | 20 | 21 | 22 | 23 | 24 | 25 | 26 | 27 | 28 | 29 | 30 | 31 | 32 |
| P3 | A5 | O1[1] | P4 | E2 | P2 | O4[1/2] | O5 | A4[1] | P1[1/2] | F1 | E1 | E3 | E4 | E5 | R1 | R3 |
| 40 | 32 | 34 | 32 | 20 | 24 | 39 | 39 | 25 | 28 | 26 | 15 | -9 | 19 | -7 | 22 | 20 |
| 33 | 22 | 32 | 12 | 18 | 19 | 43 | 43 | 29 | 23 | 33 | 14 | -78 | 21 | 2 | 21 | 20 |
| 31 | 34 | 37 | 23 | 18 | 5 | 26 | 45 | 22 | 23 | 37 | 17 | -40 | 23 | 2 | 23 | 23 |
| 23 | 33 | 39 | 8 | 17 | 19 | 39 | 44 | 31 | 22 | 44 | 15 | -61 | 28 | 14 | 27 | 23 |
| 32 | 54 | 44 | 23 | 21 | 19 | 29 | 44 | 32 | 23 | 49 | 13 | -34 | 32 | 14 | 26 | 27 |
| 31 | 51 | 40 | 16 | 27 | 24 | 39 | 41 | 45 | 19 | 56 | 8 | -22 | 28 | 17 | 30 | 32 |
| 35 | 53 | 42 | 40 | 32 | 37 | 41 | 43 | 51 | 24 | 67 | 5 | 38 | 27 | 18 | 30 | 39 |
| 48 | 39 | 44 | 27 | 30 | 40 | 46 | 55 | 57 | 28 | 73 | 6 | -2 | 39 | 26 | 36 | 37 |
| 59 | 40 | 49 | 45 | 36 | 37 | 46 | 46 | 53 | 26 | 83 | 8 | 23 | 31 | 21 | 39 | 50 |
| 57 | 26 | 45 | 40 | 34 | 42 | 46 | 57 | 54 | 29 | 87 | 15 | -5 | 35 | 21 | 40 | 43 |
| 60 | 44 | 52 | 47 | 36 | 43 | 46 | 53 | 44 | 33 | 87 | 16 | 11 | 32 | 32 | 37 | 48 |
| 62 | 56 | 58 | 44 | 40 | 39 | 53 | 73 | 42 | 36 | 86 | 19 | -7 | 34 | 42 | 40 | 42 |
| 59 | 62 | 61 | 53 | 50 | 50 | 64 | 62 | 46 | 40 | 80 | 16 | 1 | 28 | 40 | 35 | 57 |
| 55 | 62 | 61 | 54 | 48 | 57 | 69 | 79 | 54 | 44 | 91 | 17 | -4 | 34 | 50 | 31 | 56 |
| 60 | 77 | 72 | 61 | 57 | 53 | 77 | 74 | 65 | 46 | 89 | 14 | 2 | 29 | 62 | 33 | 68 |
| 67 | 69 | 78 | 62 | 60 | 41 | 82 | 75 | 76 | 47 | 111 | 18 | -1 | 34 | 65 | 34 | 60 |
| 74 | 75 | 85 | 62 | 66 | 56 | 89 | 75 | 82 | 46 | 115 | 21 | 0 | 31 | 65 | 41 | 70 |
| 62 | 76 | 86 | 67 | 82 | 65 | 88 | 80 | 81 | 48 | 139 | 24 | 0 | 29 | 70 | 45 | 57 |
| 77 | 94 | 91 | 68 | 86 | 65 | 91 | 86 | 79 | 59 | 135 | 28 | -1 | 27 | 66 | 48 | 57 |
| 71 | 108 | 93 | 84 | 96 | 60 | 95 | 93 | 80 | 64 | 145 | 28 | -4 | 29 | 67 | 51 | 58 |
|  | 119 | 100 | 83 | 94 | 80 | 95 | 109 | 85 | 69 | 132 | 29 | -4 | 29 | 69 | 56 | 70 |
|  |  | 101 | 94 | 89 | 86 | 100 | 104 | 98 | 74 | 142 | 29 | -5 | 27 | 70 | 55 | 74 |
|  |  |  | 73 | 108 | 123 | 110 | 78 | 134 | 32 | -2 | 31 | 72 | 58 | 85 |
|  |  |  |  | 79 | 122 | 121 | 113 | 71 | 145 | 34 | -5 | 32 | 73 | 60 | 91 |
|  |  |  |  |  | 135 | 137 | 127 | 71 | 146 | 41 | -4 | 35 | 73 | 65 | 93 |
|  |  |  |  |  |  |  | 125 | 76 | 157 | 45 | -4 | 34 | 69 | 66 | 88 |
|  |  |  |  |  |  |  | 129 | 68 | 159 | 52 | -3 | 38 | 67 | 70 | 87 |
|  |  |  |  |  |  |  |  | 66 | 168 | 56 | -6 | 39 | 64 | 74 | 92 |
|  |  |  |  |  |  |  |  | 82 | 173 | 59 | -3 | 42 | 66 | 78 | 95 |
|  |  |  |  |  |  |  |  | 86 | 182 | 68 | -6 | 42 | 66 | 82 | 103 |
|  |  |  |  |  |  |  |  |  | 189 | 69 | -6 | 46 | 67 | 86 | 110 |
|  |  |  |  |  |  |  |  |  | 198 | 71 | -8 | 48 | 70 | 91 | 115 |
|  |  |  |  |  |  |  |  |  | 206 | 65 | -7 | 52 | 74 | 94 | 113 |
|  |  |  |  |  |  |  |  |  | 214 | 55 | -8 | 51 | 76 | 101 | 117 |
|  |  |  |  |  |  |  |  |  | 224 | 54 | -6 | 54 | 73 | 106 | 115 |
|  |  |  |  |  |  |  |  |  | 232 | 51 | -7 | 54 | 77 | 114 | 123 |
|  |  |  |  |  |  |  |  |  | 240 | 49 | -7 | 55 | 83 | 122 | 124 |
|  |  |  |  |  |  |  |  |  | 251 | 57 | -6 | 54 | 81 | 130 | 133 |
|  |  |  |  |  |  |  |  |  | 260 | -46 | -6 | 56 | 91 | 136 | 134 |

| FIG. 5A | FIG. 5B |
|---|---|

Vsdm*Srad (m/s * mm)

| | All-Fire Events | | | | | | | | | | | |
|---|---|---|---|---|---|---|---|---|---|---|---|---|
| | 1 | 2 | 3 | 4 | 5 | 6 | 7 | 8 | 9 | 10 | 11 | 12 |
| Time | F8 | F7 | F6 | F5 | $F4^{1/2}$ | R2 | $F2^1$ | $F3^1$ | A3 | R4 | O3 | $O2^{1/2}$ |
| 0 | 0 | 0 | 0 | 0 | 0 | 0 | 0 | 0 | 0 | 0 | 0 | 0 |
| 1.25 | 0 | 0 | 0 | 0 | 0 | 0 | 0 | 0 | 0 | 0 | 0 | 0 |
| 2.5 | 0 | 0 | 0 | 0 | 0 | 1 | 0 | 0 | 0 | 0 | 0 | 0 |
| 3.75 | 1 | 1 | 0 | 0 | 0 | 1 | 0 | 0 | 0 | 1 | 1 | 1 |
| 5 | 4 | 3 | 1 | 1 | 1 | 1 | 1 | 0 | 1 | 1 | 1 | 1 |
| 6.25 | 5 | 5 | 2 | 2 | 2 | 1 | 1 | 1 | 1 | 1 | 1 | 2 |
| 7.5 | 8 | 8 | 4 | 4 | 3 | 3 | 2 | 2 | 2 | 2 | 2 | 2 |
| 8.75 | 9 | 11 | 6 | 6 | 5 | 3 | 3 | 3 | 3 | 3 | 3 | 3 |
| 10 | 13 | 12 | 8 | 9 | 9 | 5 | 4 | 4 | 5 | 4 | 3 | 3 |
| 11.25 | 15 | 18 | 8 | 12 | 11 | 8 | 7 | 6 | 7 | 5 | 5 | 4 |
| 12.5 | 22 | 21 | 11 | 14 | 14 | 11 | 8 | 7 | 10 | 6 | 6 | 5 |
| 13.75 | 30 | 32 | 13 | 19 | 16 | 15 | 11 | 10 | 12 | 8 | 8 | 6 |
| 15 | 47 | 38 | 16 | 23 | 20 | 19 | 14 | 12 | 16 | 10 | 10 | 7 |
| 16.25 | 61 | 54 | 20 | 29 | 23 | 26 | 18 | 16 | 20 | 11 | 11 | 8 |
| 17.5 | 75 | 72 | 27 | 36 | 31 | 31 | 21 | 20 | 25 | 12 | 13 | 8 |
| 18.75 | 91 | 89 | 33 | 48 | 39 | 37 | 27 | 25 | 32 | 14 | 18 | 10 |
| 20 | 107 | 107 | 39 | 58 | 46 | 51 | 31 | 31 | 38 | 16 | 22 | 13 |
| 21.25 | 116 | 138 | 45 | 71 | 52 | 67 | 40 | 37 | 46 | 17 | 26 | 18 |
| 22.5 | 128 | 162 | 52 | 87 | 60 | 86 | 46 | 46 | 55 | 25 | 31 | 22 |
| 23.75 | 130 | 190 | 63 | 101 | 71 | 104 | 55 | 53 | 66 | 28 | 37 | 27 |
| 25 | 146 | 214 | 75 | 121 | 80 | 124 | 67 | 64 | 78 | 37 | 44 | 29 |
| 26.25 | 157 | 234 | 88 | 146 | 100 | 144 | 77 | 75 | 100 | 38 | 52 | 33 |
| 27.5 | 172 | 260 | 105 | 176 | 116 | 160 | 92 | 88 | 117 | 44 | 62 | 37 |
| 28.75 | 182 | 283 | 123 | 212 | 138 | 188 | 101 | 102 | 140 | 47 | 76 | 45 |
| 30 | 198 | 309 | 146 | 248 | 158 | 207 | 112 | 119 | 159 | 51 | 89 | 52 |
| 31.25 | 211 | 324 | 158 | 291 | 185 | 239 | 124 | 139 | 181 | 53 | 104 | 62 |
| 32.5 | 226 | 370 | 175 | 330 | 212 | 259 | 139 | 162 | 212 | 58 | 116 | 70 |
| 33.75 | 243 | 405 | 188 | 373 | 242 | 294 | 154 | 188 | 242 | 65 | 132 | 80 |
| 35 | 280 | 441 | 204 | 411 | 270 | 327 | 170 | 215 | 271 | 77 | 144 | 88 |
| 36.25 | 303 | 483 | 214 | 462 | 299 | 381 | 187 | 243 | 309 | 86 | 165 | 97 |
| 37.5 | 350 | 539 | 232 | 497 | 325 | 409 | 208 | 269 | 347 | 91 | 180 | 107 |
| 38.75 | 420 | 603 | 250 | 550 | 350 | 432 | 235 | 304 | 386 | 99 | 205 | 119 |
| 40 | 486 | 651 | 268 | 589 | 377 | 469 | 262 | 336 | 426 | 101 | 227 | 133 |
| 41.25 | 517 | 721 | 287 | 643 | 401 | 488 | 295 | 376 | 468 | 108 | 255 | 148 |
| 42.5 | 593 | 799 | 300 | 689 | 434 | 523 | 329 | 416 | 507 | 114 | 288 | 165 |
| 43.75 | 642 | 872 | 321 | 745 | 473 | 608 | 364 | 453 | 549 | 128 | 319 | 184 |
| 45 | 726 | 952 | 342 | 796 | 514 | 708 | 402 | 500 | 612 | 145 | 354 | 203 |
| 46.25 | 775 | 1003 | 360 | 855 | 552 | 788 | 441 | 550 | 673 | 159 | 392 | 223 |
| 47.5 | 871 | 1124 | 384 | 913 | 591 | 898 | 484 | 601 | 682 | 177 | 427 | 249 |
| 48.75 | 943 | 1278 | 395 | 968 | 632 | 986 | 531 | 656 | 742 | 187 | 459 | 273 |
| 50 | 1016 | 1352 | 431 | 1034 | 670 | 1080 | 576 | 713 | 809 | 199 | 510 | 307 |
| 51.25 | 1091 | 1446 | 473 | 1112 | 721 | 1132 | 623 | 768 | 871 | 219 | 555 | 336 |
| 52.5 | 1140 | 1538 | 490 | 1206 | 756 | 1235 | 668 | 823 | 964 | 239 | 595 | 374 |
| 53.75 | 1230 | 1666 | 543 | 1277 | 803 | 1332 | 716 | 875 | 1064 | 259 | 652 | 413 |

Event requirements: "1" - a single stage inflation; "1/2" - either a single or dual stage inflation; Unmarked - a dual stage inflation.

NOTES
1. Shaded boxes signify the $V_{sdm}S_{rad}$ values corresponding to those shaded POM boxes (the second one in each column) in FIG. 3
2. These values will be used in FIG. 5

FIG. 5A

| All-Fire Events | | | | | | | | | | | | |
|---|---|---|---|---|---|---|---|---|---|---|---|---|
| 13 | 14 | 15 | 16 | 17 | 18 | 19 | 20 | 21 | 22 | 23 | 24 | 25 |
| A2 | A6 | A1 | P3 | A5[1] | O1 | P4[1] | E2 | P2 | O4[1/2] | O5 | A4[1] | P1[1/2] |
| 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 |
| 0 | 0 | 0 | 0 | 0 | 1 | 0 | 1 | 1 | 1 | 0 | 0 | 0 |
| 1 | 0 | 1 | 1 | 0 | 1 | 1 | 2 | 1 | 1 | 0 | 0 | 1 |
| 1 | 1 | 1 | 1 | 0 | 1 | 1 | 3 | 1 | 1 | 1 | 0 | 1 |
| 1 | 1 | 1 | 0 | 1 | 2 | 1 | 4 | 1 | 2 | 2 | 0 | 1 |
| 2 | 2 | 2 | 1 | 1 | 3 | 1 | 5 | 1 | 2 | 2 | 1 | 1 |
| 3 | 3 | 3 | 1 | 2 | 4 | 2 | 7 | 2 | 3 | 3 | 1 | 1 |
| 4 | 4 | 3 | 2 | 4 | 5 | 2 | 10 | 3 | 4 | 4 | 1 | 1 |
| 6 | 5 | 4 | 4 | 5 | 6 | 3 | 12 | 5 | 5 | 5 | 2 | 2 |
| 9 | 10 | 5 | 6 | 6 | 8 | 4 | 13 | 6 | 6 | 8 | 3 | 2 |
| 12 | 11 | 7 | 10 | 8 | 10 | 6 | 16 | 9 | 8 | 9 | 4 | 3 |
| 15 | 17 | 8 | 13 | 8 | 11 | 8 | 16 | 13 | 10 | 11 | 5 | 3 |
| 20 | 21 | 11 | 17 | 13 | 13 | 11 | 20 | 17 | 13 | 14 | 6 | 4 |
| 26 | 27 | 12 | 21 | 17 | 16 | 14 | 24 | 20 | 16 | 20 | 7 | 6 |
| 33 | 29 | 16 | 25 | 20 | 19 | 18 | 29 | 28 | 21 | 22 | 9 | 8 |
| 41 | 36 | 18 | 30 | 24 | 22 | 24 | 31 | 37 | 26 | 28 | 11 | 11 |
| 52 | 41 | 22 | 35 | 30 | 26 | 31 | 35 | 42 | 31 | 32 | 14 | 15 |
| 65 | 47 | 27 | 42 | 35 | 31 | 37 | 40 | 41 | 38 | 36 | 17 | 18 |
| 79 | 57 | 32 | 50 | 44 | 37 | 42 | 44 | 52 | 46 | 45 | 19 | 22 |
| 96 | 69 | 37 | 52 | 51 | 42 | 49 | 52 | 66 | 51 | 52 | 22 | 28 |
| 111 | 82 | 43 | 67 | 66 | 49 | 56 | 53 | 75 | 57 | 64 | 25 | 36 |
| 132 | 90 | 50 | 71 | 85 | 55 | 71 | 59 | 75 | 65 | 75 | 31 | 43 |
| 151 | 103 | 60 | 79 | 103 | 63 | 76 | 59 | 90 | 72 | 94 | 37 | 50 |
| 170 | 117 | 72 | 85 | 118 | 70 | 87 | 60 | 107 | 84 | 107 | 45 | 58 |
| 194 | 125 | 84 | 101 | 137 | 76 | 87 | 65 | 111 | 98 | 133 | 53 | 67 |
| 215 | 150 | 103 | 107 | 165 | 86 | 105 | 67 | 124 | 117 | 150 | 59 | 71 |
| 245 | 161 | 119 | 128 | 188 | 95 | 112 | 78 | 134 | 138 | 177 | 71 | 78 |
| 264 | 190 | 143 | 140 | 207 | 104 | 126 | 88 | 144 | 152 | 192 | 78 | 87 |
| 303 | 215 | 161 | 155 | 226 | 114 | 131 | 91 | 163 | 173 | 200 | 90 | 88 |
| 322 | 247 | 186 | 163 | 255 | 126 | 145 | 106 | 180 | 181 | 227 | 98 | 96 |
| 357 | 279 | 209 | 170 | 272 | 137 | 162 | 114 | 201 | 201 | 241 | 110 | 115 |
| 388 | 302 | 235 | 170 | 301 | 149 | 173 | 137 | 221 | 212 | 264 | 121 | 127 |
| 417 | 325 | 260 | 177 | 333 | 161 | 190 | 150 | 254 | 232 | 290 | 137 | 146 |
| 451 | 361 | 289 | 172 | 362 | 177 | 197 | 178 | 313 | 245 | 322 | 155 | 161 |
| 485 | 398 | 312 | 159 | 401 | 193 | 221 | 199 | 354 | 258 | 343 | 167 | 181 |
| 527 | 443 | 342 | 161 | 435 | 209 | 253 | 234 | 379 | 276 | 366 | 183 | 199 |
| 566 | 486 | 371 | 147 | 465 | 228 | 265 | -2 | 434 | 290 | 385 | 215 | 217 |
| 614 | 535 | 409 | 127 | 503 | 248 | 306 | -2 | 450 | 306 | 424 | 233 | 240 |
| 664 | 611 | 446 | 102 | 554 | 271 | 335 | -2 | 522 | 324 | 460 | 260 | 261 |
| 729 | 682 | 483 | 69 | 603 | 295 | 388 | -2 | 538 | 349 | 502 | 268 | 297 |
| 793 | 783 | 523 | 26 | 645 | 322 | 430 | -2 | 598 | 368 | 544 | 299 | 324 |

FIG. 5B

| Generic Unibody- Adaptive Air Bag Calibration Performance | JERK-FREE ALGORITHM - EMBODIMENT #1 (SDM + Center Upper Rad. Tie Bar) | | | |
|---|---|---|---|---|
| | Stage 1 | | Stage 2 | |
| Test Events | Goal Time* (ms) | Predicted | 2nd Stage Delay Goal (ms) | Predicted |
| F1 - 12.0 mph (19.3kph) 0 degree frontal barrier | NT | NT | NT | NT |
| F2 - 15.8 mph (25.5kph) 0 degree frontal barrier | 28 | 17 | NT | NT |
| F3 - 17.9 mph (28.9kph) 0 degree frontal barrier | 26 | 19 | NT | NT |
| F4 - 19.9 mph (32.1kph) 0 degree frontal barrier | 24 | 14 | NT/5 | 0 |
| F5 - 22.0 mph (35.5kph) 0 degree frontal barrier | 22 | 15 | 5 | 0 |
| F6 - 23.8 mph (38.4kph) 0 degree frontal barrier | 20 | 13 | 5 | 0 |
| F7 - 30.7 mph (49.4kph) 0 degree frontal barrier | 15 | 12 | 5 | 0 |
| F8 - 35.0 mph (56.4kph) 0 degree frontal barrier | 14 | 12 | 5 | 0 |
| A1 - 19.8 mph (32.2kph) 30 deg left angle barrier | 36 | 28 | NT | NT |
| A2 - 26.0 mph (41.9kph) 30 deg left angle barrier | 34 | 26 | 5 | 0 |
| A3 - 30.7 mph (49.5kph) 30 deg left angle barrier | 29 | 20 | 5 | 0 |
| A4 - 19.8 mph (31.9kph) 30 deg right angle barrier | 45 | 44 | NT | NT |
| A5 - 25.8 mph (41.7kph) 30 deg right angle barrier | 36 | 32 | 5 | 0 |
| A6 - 30.0 mph (48.3kph) 30 deg right angle barrier | 33 | 32 | 5 | 0 |
| P1 - 19.9 mph (32.0kph) 350 mm dia center pole | 47 | 39 | NT/5 | NT |
| P2 - 25.0 mph (40.3kph) 350 mm dia center pole | 40 | 38 | 5 | 0 |
| P3 - 30.2 mph (48.6kph) 350 mm dia center pole | 34 | 33 | 5 | 0 |
| P4 - 30.1 mph (48.4kph) 200 mm right of center pole | 37 | 36 | 5 | 0 |
| O1 - 25.0 mph (40.3kph) left 40% offset deformable barrier | 38 | 32 | NT | NT |
| O2 - 35.0 mph (56.4kph) left 40% offset deformable barrier | 31 | 27 | NT/5 | 27 |
| O3 - 40.1 mph (64.5kph) left 40% offset deformable barrier | 30 | 25 | 5 | 0 |
| O4 - 35.1 mph (56.6kph) right 40% offset deformable barrier | 38 | 27 | NT/5 | 0 |
| O5 - 40.2 mph (64.7kph) right 40% offset deformable barrier | 37 | 24 | 5 | 0 |
| R1 - 9.9 mph (16.0kph) left 40% offset rigid barrier (Danner) | NT | NT | NT | NT |
| R2 - 34.0 mph (54.8kph) left 50% offset rigid barrier (AMS) | 25 | 19 | 5 | 0 |
| R3 - 9.8 mph (15.8kph) rt 40% offset rigid barrier (Thatcham) | NT | NT | NT | NT |
| R4 - 34.0 mph (54.8kph) right 50% offset rigid barrier (AMS) | 28 | 23 | 5 | 0 |
| E1 - 10.0 mph (16.1kph) under-ride impact | NT | NT | NT | NT |
| E2 - 24.9 mph (40.1kph) 100% overlap under-ride barrier | 47 | 43 | 5 | 0 |
| E3 - 20.0 mph (32.2kph) under-carriage interference impact | NT | NT | NT | NT |
| E4 - 49.8 mph (80.2kph) deer impact simulation | NT | NT | NT | NT |
| E5 - 43.4 mph (69.9kph) moose impact simulation | NT | NT | NT | NT |

FIG. 6

VEHICLE IMPACT-SENSING METHOD WITH IMPROVED SEVERITY DISCRIMINATION

TECHNICAL FIELD

This invention relates to impact-sensing systems for road vehicles. More particularly, it relates to an improved system for timing the initiation of deploying of devices such as airbags.

BACKGROUND OF THE INVENTION

It is well known that the total available time for an airbag to effectively restrain occupants in a severe event is very short; accordingly, occupant restraining systems must have the ability to timely and reliably determine the occurrence of an impact and to deploy the airbags to an operative condition within the available time. On the other hand, the system must be immune to deployment during minor impact events for which airbag restraint is not needed.

There is also a need for an improved method for calibration of control systems for airbags and other such devices. It is common practice in calibrating such control systems to develop the required calibration data from measurements taken in actual impact testing of each new vehicle model (referred to as alpha-build prototypes) so that the control system calibration for that model is especially established according to its characteristics. The testing of a vehicle is time consuming and costly; accordingly, a calibration method is needed which does not require actual impact testing of vehicles.

In the prior art, attempts have been made to discriminate the severity of the impact event using acceleration and jerk signals which cannot be reliably generated from computer simulations, such as finite element analysis. Accordingly, it is highly desirable to have an algorithm which does not rely upon acceleration and jerk measures to discriminate the severity of an impact event.

There is a need for an impact-sensing algorithm which relies upon velocity-based measures which can be obtained without need for the alpha-build procedure of impact testing prototype vehicles to calibrate the sensing system. Preferably, the velocity-based measures are obtained by use of computer or finite element models (FEM) for calibration of sensing systems.

In the prior art, the Watanabe et al. U.S. Pat. No. 5,787,377 granted Jul. 28, 1998 describes an airbag ignition timing system which processes vehicle acceleration signals to predict when a passenger will reach a front surface of the airbag. The ignition timing circuit processes acceleration signals to obtain plural displacement signals and adds them together to derive a predicted displacement signal and compare it with a reference value. An ignition signal is issued in the event the predicted displacement signal exceeds the reference value. In this system, predicted occupant displacement and impact severity are processed in a parallel manner as distinguished from a sequential manner.

The Nitschke et al. U.S. Pat. No. 5,540,461 granted Jul. 30, 1996 discloses an occupant restraint system using velocity calculations based on a filtered acceleration signal. The occupant displacement and relative speed with respect to the passenger compartment are estimated and compared with presettable limit values.

The Adolph et al. U.S. Pat. No. 5,785,347 granted Jul. 28, 1998 discloses an airbag deployment system which includes a pre-impact sensor and an impact detection sensor to predict impacts and to determine the severity of the predicted impacts. Sensors disposed in the vehicle determine passenger location and activate the airbags accordingly. Single- or multi-stage airbags may be deployed in accordance with the impact severity.

SUMMARY OF THE INVENTION

In accordance with this invention, a vehicle impact-sensing system is provided which discriminates severe events which require actuation of safety devices from minor incidents which do not require such actuation. This is accomplished by use of one or more vehicle-mounted accelerometers and an associated signal processing algorithm in a microprocessor.

Further, the impact-sensing computer program is based on an algorithm which uses only velocity and displacement measures which can be reliably generated from computer simulations that discriminate the severity of an event. This is accomplished without the need for generating acceleration/jerk measures; thus, the algorithm enables math-based impact-sensing system calibration to reduce or eliminate the costly alpha-build vehicle tests.

Further, in accordance with this invention, predicted occupant movement, used as a measure to determine the firing time for deploying airbags, makes the actual sensing time close to the desired sensing time.

Further, in accordance with this invention, deployment of airbags is controlled by the steps of determining whether an impact event has a high likelihood potential and, if it does, calculating the predicted occupant movement using velocity-based measures. If the predicted occupant movement exceeds a predetermined movement threshold, impact severity measure is determined as a function of vehicle velocity change. If the impact severity measure exceeds a predetermined severity threshold, the airbag inflator is actuated.

A complete understanding of this invention may be obtained from the detailed description that follows taken with the accompanying drawings.

BRIEF DESCRIPTION OF THE DRAWINGS

FIGS. 3 (3A and 3B) is a table showing all-fire and no-fire events of a given vehicle in a plot of time versus likelihood potential data of various impact events;

FIGS. 4 (4A and 4B) is a table showing all-fire and no-fire events of a given vehicle in a plot of time versus predicted occupant movement in various impact events;

FIGS. 5 (5A and 5B) is a table showing all-fire events of a given vehicle in a plot of time versus impact severity data of various impact events; and FIG. 6 is a table showing predicted sensing times for various impact events of a given vehicle for the first embodiment of this invention.

DESCRIPTION OF THE PREFERRED EMBODIMENT

In some uses of occupant restraint devices, such as airbags, it is desirable for the control system which initiates deployment of the airbag to discriminate between a minor impact event which does not require airbag deployment and severe impact events which do require airbag deployment. Because of the differences in impact characteristics of different models of vehicles, it is necessary to calibrate the airbag deployment control system of each vehicle model in accordance with the impact characteristics of the particular model. In a properly calibrated system, the airbags would only be deployed when the predicted impact severity taken with the impact characteristics of the vehicle model exceed certain levels.

Figure 1:
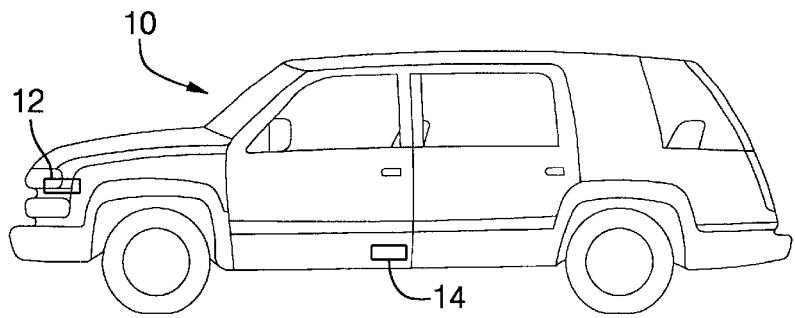
FIG. 1 is a diagrammatic representation of a road vehicle showing typical location of certain sensors.

Referring now to the drawings, FIG. 1 depicts the location of impact sensors in a typical vehicle installation. As shown, the vehicle 10 is provided with a remote accelerometer 12 which is mounted at the center of the radiator-tie-bar at the front end of the vehicle for sensing velocity changes at the radiator-tie-bar. The vehicle is also provided with an SDM accelerometer 14 which is located underneath the passenger seat as a part of the signal and diagnostic module (SDM) of the vehicle impact-sensing system. According to the invention, the vehicle impact-sensing system detects and discriminates severe impact events from minor impact incidents by signals derived from accelerometers 12 and 14. Such derived signals are used in the signal processing algorithm of this invention which is implemented in the control program within the microcomputer of the impact-sensing system. As discussed above, the sensing algorithm relies only on velocity/displacement-based measures which are derived from the acceleration signals generated by the accelerometers 12 and 14 which will be described below. Thus, the calibration of the impact-sensing system on the vehicle may be done using finite element analysis (FEA) instead of alpha-build impact testing of prototype vehicles. As discussed above, the FEA simulation shows good comparison with the alpha-build tests provided that the sensing algorithm uses velocity-based measures.

Figure 2:
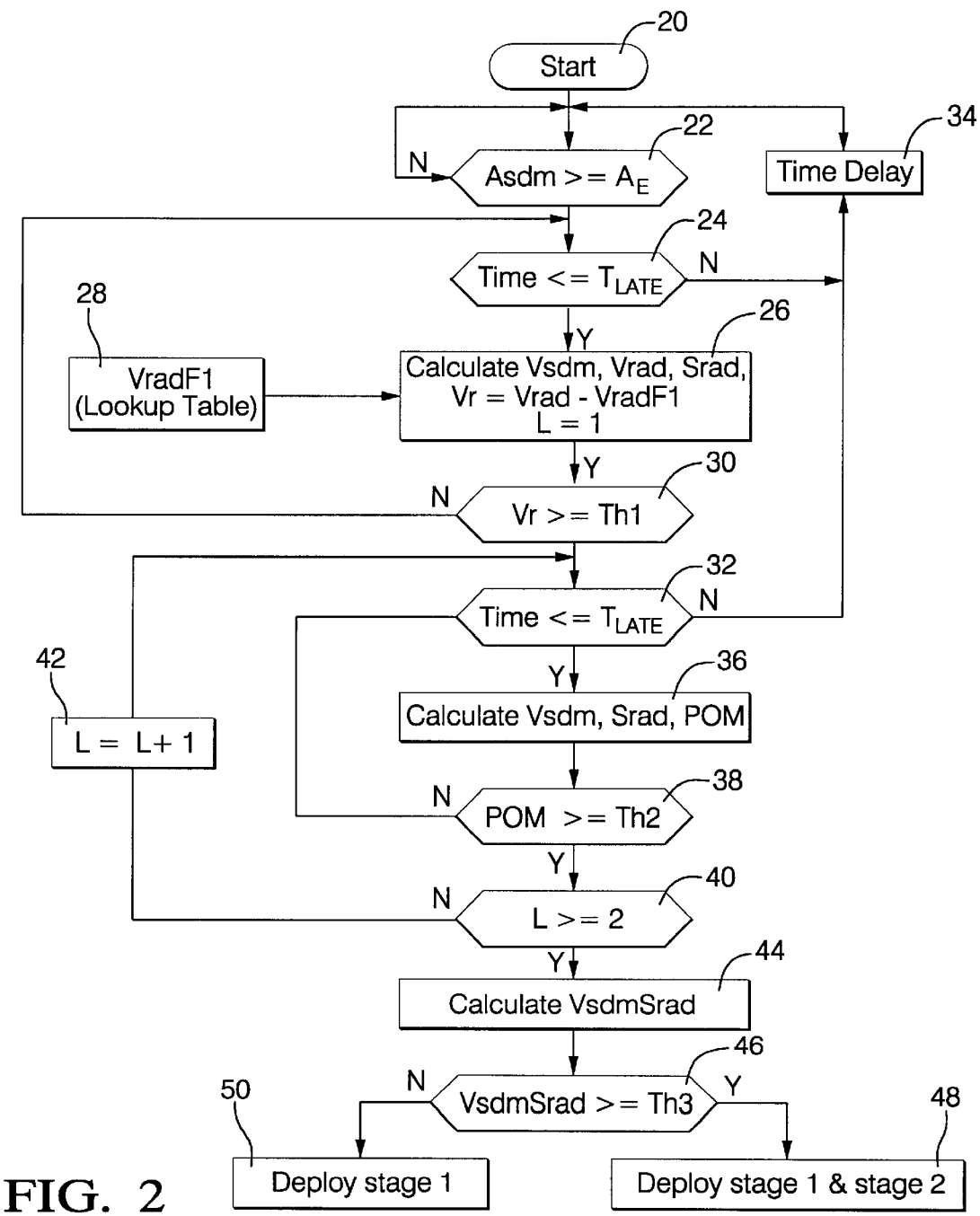
FIG. 2 is a flow chart representing a first embodiment of the computer program of this invention.

FIG. 2 of the drawings is a computer program flow chart which represents a first embodiment of a impact-sensing algorithm for controlling actuation of airbags with discrimination between minor impact incidents and severe impact events. The flow chart has a program start block 20 which initializes the computer program when the vehicle is started. The sensing algorithm uses the acceleration signals $A_{sdm}$ from the SDM accelerometer 14 to enable operation of the impact-sensing system. The sensing system is enabled for impact-sensing operation by the test block 22 which determines whether the acceleration of the vehicle $A_{sdm}$ is equal to or greater than a predetermined acceleration threshold $A_E$ which, for example, may be set at 3 g's. If $A_{sdm}$ is not greater than the threshold $A_E$, the program loops back to the input of test block 22. If $A_{sdm}$ is equal to or greater than the threshold, the program advances to a preliminary test block 24 which follows the enable test block 22 to determine whether the elapsed time after the program is enabled is equal to or less than a predetermined elapsed time $T_{LATE}$ which is of such duration that it is too late to effectively deploy the airbags. If it is too late, the program loops back to the time delay block 34 which, after a predetermined time delay causes the program to loop back to the enable test block 22. If it is not too late, the program advances from the preliminary test block 24 to the calculation block 26 which begins an evaluation of the likelihood potential of an impact event in the first phase of a decision making process carried out by the impact-sensing program.

In this first phase, the likelihood potential is evaluated using a likelihood measure $V_r$ derived from the signals provided by an early warning sensor which, in the illustrative embodiment, is the remote accelerometer 12. (It will be understood that a pre-impact sensor may be used as the early warning sensor.) In the calculation block 26, the acceleration signal from the remote accelerometer 12 is used to calculate the velocity changes $V_{rad}$ at the radiator-tie-bar and to calculate the displacement $S_{rad}$ at the radiator-tie-bar. Also, the calculation block 26 calculates the value of the vehicle velocity change $V_{sdm}$ at time t. Block 26 also sets the loop count L equal to 1. The calculation block 26 determines the value of a reference quantity $V_{adF1}$ which is accessed from a look-up table 28. The reference quantity $V_{radF1}$ is a given value of $V_{rad}$ from a no-fire frontal barrier impact event, for example, a 12 MPH frontal barrier impact. The calculation block 26 calculates the likelihood measure $V_r$ in accordance with equation (1) as follows:

$$V_r = V_{rad} - V_{radF1} \tag{1}$$

Then, the program advances to decision block 30, which determines whether the likelihood measure $V_r$ is equal to or greater than a predetermined threshold Th1. If it is, the event is considered to have a high likelihood potential and the program advances to the second phase of the decision making process.

In the second phase, the timing to trigger the deployment of airbags is determined using the predicted occupant movement (POM) as the measure. A preliminary test block 32 determines whether the time is less than or equal to TLATE. If it is greater, the program loops back through the time delay block 34 which interposes a time delay and then proceeds to the enable test block 22. If it is not greater, the program advances to the calculation block 36. At this block, the value of velocity change Vsdm is calculated based on the acceleration signal from the SDM accelerometer 14, and the displacement of the radiator-tie-bar Srad is calculated based on the acceleration signal from the remote accelerometer 12. Also, at block 36, the predicted occupant movement POM is calculated in accordance with equation (2) as follows:

$$POM = S_{sdm} + V_{sdm} t_d + \tfrac{1}{2} a_d t_d^2 \tag{2}$$

at time $t+t_d$, where:

$S_{sdm}$=vehicle displacement at time t,
$V_{sdm}$=vehicle velocity change at time t,
$t_d$=required airbag inflation time
$a_d$=average acceleration obtained from averaging a finite duration of measured accelerations prior to the time t.

Then, the program advances from calculation block 36 to decision block 38 which determines whether the POM is equal to or greater than a predetermined movement threshold Th2. If it is not, the program loops back to the preliminary test block 32. If it is, the program advances to test block 40, which requires the POM to exceed the threshold Th2 twice before proceeding to the third phase of the impact-sensing program. The decision block 40 determines whether the loop count is equal to or greater than two. If it is not, the program loops back through the loop count block 42, which increments the value of L by one and proceeds back to the preliminary test block 32. If the loop count is two or greater, the program advances from the decision block 40 to the calculation block 44, which is the start of the third phase of the decision-making process. It will be understood that the requirement for the POM to exceed the threshold twice is selected for the purpose of increasing the robustness of the sensing system; if desired, the algorithm may require a POM to exceed the threshold more than twice or even only once.

In the third phase, an impact severity measure is developed as a basis for making a decision in regard to deployment of airbags. The product of the vehicle velocity change $V_{sdm}$ and the displacement of the radiator-tie-bar $S_{rad}$ is used as the severity measure and is calculated in block 44. The impact severity measure is expressed in equation (3) as follows:

$$\text{Impact Severity Measure} = V_{Sdm} S_{rad} \quad (3)$$

The program then advances to the decision block 46, which determines whether the severity measure $V_{sdm}S_{rad}$ is equal to or greater than a preset threshold Th3. If it is, the program advances to activation block 48, which initiates deployment of stage 1 and stage 2 of the airbag inflator. If it is not, the program advances to actuation stage 50, which initiates the deployment of stage 1 only.

FIGS. 3, 4 and 5 are tables of selected velocity-based measures for 32 different impact events which are used for calibrating the impact-sensing system of a vehicle. FIG. 6 identifies the 32 different impact events with alphanumeric names F1, F2, A1, etc., together with a word description of each event. The table of FIG. 6 shows predicted sensing times for each different impact event of a given vehicle with the impact-sensing system of this invention.

FIG. 3 is a table of the time versus a measure of likelihood potential $V_r$ calculated in accordance with equation (1) above for each of the test events listed in FIG. 6. The first column of the table (labelled "Time") shows the time in milliseconds which has elapsed after the occurrence of the enabling threshold $A_E$. The remaining columns are labeled with number 1 through 32 and each such column contains values of predicted occupant movement (POM) for a particular impact event of the same vehicle. Each of the columns 1 through 32 contains data for a particular test event which is identified by an alphanumeric name such as F8, F7 R2, etc. (In FIG. 6, the 32 different test events are listed and each is identified by its alphanumeric name and is briefly described.) For example, column 1 in FIG. 3 contains data for test event F8, which is a vehicle impact at 35.0 mph with a frontal barrier at zero degrees. Likewise, columns 2 through 32 contain data for the different impact events for the same vehicle. In the chart of FIG. 3, the impact events corresponding with columns 1–25 are grouped under the title "All-Fire Events" and the events in columns 26–32 are grouped under the title "No-Fire Events". The All-Fire Events are those in which the airbag is inflated with either a single stage inflation, indicated by a superscript "1" on the alphanumeric name, or with a single or dual stage inflation which are those having superscript "½" and those events which have no superscript are a dual stage inflation. There is no inflation of the airbags in the events in columns 26 through 32. In the table of FIG. 3, the value of threshold Th1 is 0.4 meters per second. The shaded box signifies when the measure first becomes greater than or equal to the threshold value. In the example shown in FIG. 3 for the F8 impact event, the measure reaches a value of 1.0 meter per second at time 2.5 milliseconds. Note that for each of the different impact events, all data after the desired sensing time are truncated from the table.

FIG. 4 is a table of time versus predicted occupant movement (POM) calculated in accordance with equation (2) above. In the table of FIG. 4, the value of threshold Th2 is 73 millimeters of occupant movement. The first shaded box in each event signifies when the measure becomes equal to or greater than the threshold value. The time corresponding to the second shaded box in each column is the predicted sensing time. In the example shown in FIG. 4 for the F8 impact event, the predicted sensing time is 7.5 milliseconds for a POM of 104 millimeters. Note that for each of the different impact events, all data after the desired sensing time are truncated from the chart.

FIG. 5 is a table of time versus a measure of impact severity $V_{sdm} S_{rad}$ calculated in accordance with equation (3) above for each of the All-Fire test events which are the same as those shown in FIG. 4. In the table of FIG. 5, threshold Th3 is a preset value. In the table, the shaded boxes signify the $V_{sdm} S_{rad}$ values corresponding to the shaded POM boxes (the second one in each column) in FIG. 4. These values are used to determine the sensing time shown in the table of FIG. 6.

Further, in accordance with this invention, an alternative impact-sensing system is implemented in a second embodiment as follows. The second embodiment is the same as the first embodiment described above except that a measure $V_{rmax}$, the maximum value of the likelihood measure $V_r$, is determined and is used in the third phase as the impact severity measure instead Of $V_{sdm} \times S_{rad}$ which is used in the first embodiment. In the second embodiment, the value of $V_{rmax}$ is compared with a preset threshold to determine the deployment of the airbags.

Although the description of this invention has been given with reference to particular embodiments, it is not to be construed in a limiting sense. Many variations and modifications will now occur to those skilled in the art. For a definition of the invention, reference is made to the appended claims.

What is claimed is:

1. The method of controlling deployment of an airbag in a vehicle, said method comprising:

determining whether an impact event has a high likelihood potential using an early warning sensor disposed near the front of the vehicle for determining velocity changes at the location of the sensor, if the event has a high likelihood potential, determining a predicted occupant movement during a predetermined time duration plus the elapsed sensing time, said calculation using velocity-based measures, if the predicted occupant movement is equal to or greater than a predetermined movement threshold, calculating an impact severity measure as a function of vehicle velocity change, and if the impact severity measure is equal to or greater than a predetermined severity threshold, activating the inflator of the airbag.

2. The method as defined by claim 1 wherein:

said early warning sensor is a remote accelerometer disposed at the front of the vehicle for determining velocity changes at the location of the remote accelerometer, and said impact severity measure is calculated as the product of the vehicle velocity change and the displacement at the remote accelerometer.

3. The method as defined by claim 1 wherein:

said early warning sensor is a remote accelerometer disposed at the front of the vehicle for determining velocity changes at the location of the remote accelerometer, and said impact severity measure is calculated as the maximum value obtained by subtracting predetermined reference value of velocity changes at said remote accelerometer from the calculated velocity changes at said remote accelerometer.

4. The method as defined by claim 1 wherein:

said early warning sensor is a remote accelerometer disposed at the front of the vehicle for generating acceleration signals, and wherein the step of determining whether an impact event has a high likelihood potential comprises calculating the velocity changes at said remote accelerometer using said acceleration signals and subtracting a predetermined reference value of velocity changes from the calculated velocity changes to obtain a difference quantity, and determining that there is high likelihood potential if the difference quantity is greater than or equal to a predetermined likelihood threshold.

5. The method defined by claim 1 wherein said vehicle has an accelerometer located in the passenger compartment and wherein the step of determining a predicted occupant movement comprises:

calculating the predicted occupant movement POM at time (t +td) using the equation:

$$POM = S_{sdm} + V_{sdm} t_d + \tfrac{1}{2} a_d t_d^2$$

where $S_{sdm}$ and $V_{sdm}$ denote the vehicle displacement and the vehicle velocity change at time t, respectively, and where $t_d$ denotes a desired time duration and $a_d$ denotes average acceleration obtained from averaging a finite duration of measured accelerations prior to the time t.

6. The method defined by claim 5 wherein:

said desired time duration is the required airbag inflation time.

7. The method defined by claim 5 including the step of:

requiring that the predicted occupant movement exceeds the predetermined movement threshold more than once before determining whether the impact severity signal is equal to or greater than the predetermined severity threshold.

8. The method defined by claim 5 wherein:

said early warning sensor is a remote accelerometer disposed at the front of the vehicle for determining velocity changes at the location of the remote accelerometer, and said impact severity measure is calculated as the product of the vehicle velocity change and the displacement at the remote accelerometer.

9. The method defined by claim 5 wherein:

said early warning sensor is a remote accelerometer disposed at the front of the vehicle for determining velocity changes at the location of the remote accelerometer, and said impact severity measure is calculated as the maximum value obtained by subtracting a predetermined reference value of velocity changes at said remote accelerometer from the calculated velocity changes at said remote accelerometer.

10. The method defined by claim 5 wherein:

said early warning sensor is a remote accelerometer disposed at the front of the vehicle for generating acceleration signals, and wherein the step of determining whether an impact event has a high likelihood potential comprises calculating the velocity changes at said remote accelerometer using said acceleration signals and subtracting a predetermined reference value of velocity changes from the calculated velocity changes to obtain a difference quantity, and determining that there is high likelihood potential if the difference quantity is greater than or equal to a predetermined likelihood threshold.

* * * * *